United States Patent
Horner et al.

(10) Patent No.: US 12,454,360 B2
(45) Date of Patent: Oct. 28, 2025

(54) CABIN PRESSURE CONTROL SYSTEM

(71) Applicant: Honeywell International Inc., Charlotte, NC (US)

(72) Inventors: Darrell W. Horner, Oro Valley, AZ (US); David Buck, Oro Valley, AZ (US); Shawn Barber, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 414 days.

(21) Appl. No.: 18/052,084

(22) Filed: Nov. 2, 2022

(65) Prior Publication Data
US 2024/0140608 A1 May 2, 2024

(51) Int. Cl.
*B64D 13/04* (2006.01)

(52) U.S. Cl.
CPC ................ *B64D 13/04* (2013.01)

(58) Field of Classification Search
CPC ....................................................... B64D 13/04
USPC ......................................................... 700/276
See application file for complete search history.

(56) References Cited

U.S. PATENT DOCUMENTS

| | | | |
|---|---|---|---|
| 6,979,257 B2 * | 12/2005 | Horner | G05D 16/202 454/74 |
| 8,500,526 B2 | 8/2013 | Horner | |
| 8,808,072 B2 | 8/2014 | Horner et al. | |
| 9,802,709 B2 | 10/2017 | Huart et al. | |
| 10,041,849 B2 | 8/2018 | Knijnenburg et al. | |
| 10,106,263 B2 | 10/2018 | Horner | |
| 2002/0173263 A1 * | 11/2002 | Petri | B64D 13/04 454/74 |
| 2003/0157875 A1 * | 8/2003 | Horner | B64D 13/04 454/74 |
| 2005/0153648 A1 * | 7/2005 | Horner | G05D 16/202 454/74 |

(Continued)

FOREIGN PATENT DOCUMENTS

| | | |
|---|---|---|
| EP | 3712069 A1 | 9/2020 |
| WO | 2021072414 A2 | 4/2021 |

OTHER PUBLICATIONS

Response to Extended Search Report dated Apr. 5, 2024, from counterpart European Application No. 23202519.7 filed Aug. 8, 2024, 55 pp.

(Continued)

*Primary Examiner* — Md Azad
(74) *Attorney, Agent, or Firm* — Shumaker & Sieffert, P.A.

(57) ABSTRACT

A cabin pressure control system comprising an automatic motor controller (AMC); and a manual motor controller (MMC) that comprises a motor configured to regulate cabin pressure; a cabin pressure sensor configured to determine a first set of cabin pressure data; a differential pressure sensor comprising first and second ports, the first port configured to obtain a second set of cabin pressure data and the second port configured to obtain a first set of ambient pressure data; processing circuitry coupled to the cabin pressure sensor and to the differential pressure sensor, the processing circuitry configured to receive the first set of cabin pressure data; determine a first set of differential pressure data, the first set of differential pressure data relating the second set of cabin pressure data with the first set of ambient pressure data; disable the AMC; and control the motor to regulate the cabin pressure.

18 Claims, 6 Drawing Sheets

(56) References Cited

U.S. PATENT DOCUMENTS

| | | |
|---|---|---|
| 2006/0019594 A1 | 1/2006 | Horner et al. |
| 2018/0052068 A1* | 2/2018 | Nicks .................... G01M 99/00 |
| 2020/0298978 A1 | 9/2020 | Horner |
| 2020/0298979 A1 | 9/2020 | Horner et al. |
| 2022/0289391 A1 | 9/2022 | Buck et al. |
| 2023/0339296 A1* | 10/2023 | Bobryshev ........... B60H 3/0608 |

OTHER PUBLICATIONS

Extended Search Report from counterpart European Application No. 23202519.7 dated Apr. 5, 2024, 9 pp.
Communication pursuant to Article 94(3) EPC from counterpart European Application No. 23202519.7 dated Jul. 10, 2025, 4 pp.

* cited by examiner

CABIN PRESSURE CONTROL SYSTEM

TECHNICAL FIELD

The disclosure relates to aircraft cabin air pressure control.

BACKGROUND

Aircraft may have a pressurized cabin to provide comfort and sufficient oxygen to a flight crew as well as passengers. In some examples, bleed air from the aircraft engines, or an engine driven air pump, may provide pressure to the aircraft interior. An outflow valve (OFV) may be used to release pressure from inside the cabin to the atmosphere to keep the internal cabin pressure within a desirable range. Some aircraft are equipped with a cabin pressure control system (CPCS) to maintain the cabin pressure altitude to within a relatively comfortable range (e.g., below approximately 8,000 feet). The CPCS may automatically allow gradual changes in the cabin pressure altitude to keep passengers and crew comfortable and maintain a cabin-to-atmosphere differential pressure below nominal and maximum limits.

SUMMARY

In most cabin pressure control systems, after a fault of an automatic control channel, a backup manual control mode is invoked. Traditional all-electric CPCS utilize a manual control where an operator of a vehicle can directly "manually" control a position of an outflow valve (OFV) via a single switch. Manual control requires significant operator workload because the cabin altitude will "drift" away from the initial cabin altitude condition because there is no closed-loop control. Further, manual control requires the operator to open and close the OFV to raise or lower the cabin altitude—resulting in uncomfortable cabin rate fluctuations. Alternatively, the operator can utilize a selector control unit and select that the target cabin altitude be raised or lowered or "held" by a closed-loop backup manual controller. However, this adjustable hold type of manual controller utilizes a single cabin pressure sensor and does not consider the positive differential pressure limit—relying on the pneumatic pressure release valve to limit the differential pressure.

Advantageously, technical aspects of the present disclosure, among other things, removes the reliance on a single pneumatic pressure relief valve, which may have a dormant failure, to limit the positive differential pressure in the event that the automatic control system erroneously increases the positive differential pressure beyond a safe limit. Technical aspects of the present disclosure use a differential pressure sensor to determine a difference between a cabin pressure and an ambient pressure outside a cabin.

In some examples, a cabin pressure control system for an aircraft includes an automatic motor controller system and a manual motor controller (MMC) system. The MMC system includes a motor configured to regulate a cabin pressure in a cabin of the aircraft. The MMC system includes a cabin pressure sensor configured to determine a first set of cabin pressure data. The MMC system includes a differential cabin pressure sensor that includes a first port and a second port. Each of the first and second ports are configured to determine a pressure at a different location of the aircraft, the first port configured to obtain a second set of cabin pressure data and the second port configured to obtain a first set of ambient pressure data. The MMC system further includes an MMC microcontroller unit (MCU) connectively coupled to the cabin pressure sensor and connectively coupled to the differential cabin pressure sensor. The MMC MCU is configured to: receive the first set of cabin pressure data from the cabin pressure sensor; receive a first set of differential pressure data from the differential pressure sensor, the first set of differential pressure data being a relation between the second set of cabin pressure data and the first set of ambient pressure data; disable the automatic motor controller based on the first set of cabin pressure data; and control the motor to regulate the cabin pressure in the cabin of the aircraft based on the first set of differential pressure data.

In some examples, a method includes receiving, by processing circuitry connectively coupled to a cabin pressure sensor and connectively coupled to a differential cabin pressure sensor, a first set of cabin pressure data from a cabin pressure sensor located within a cabin of a vehicle. The method further includes determining, by the processing circuitry, a first set of differential pressure data from a differential pressure sensor, the differential pressure sensor comprising a first port and a second port, each of the first and second ports configured to determine a pressure at a different location of the vehicle, the first port configured to obtain a second set of cabin pressure data and the second port configured to obtain a first set of ambient pressure data, the first set of differential pressure data being a relation between the second set of cabin pressure data and the first set of ambient pressure data; disabling an automatic motor controller based on the first set of cabin pressure data; and controlling a motor in a cabin of the vehicle to regulate the cabin pressure in the cabin of the vehicle based on the first set of differential pressure data.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
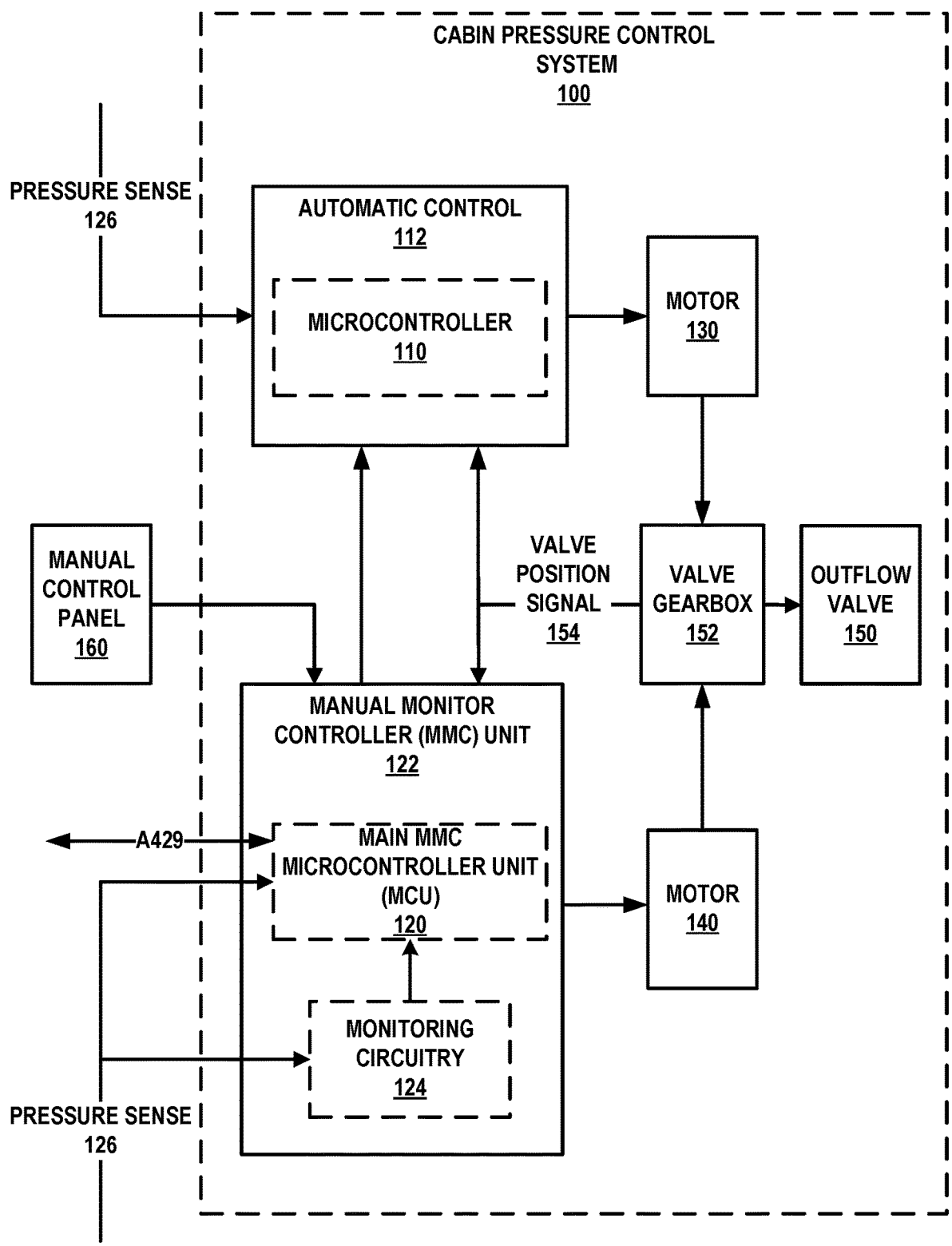
FIG. 1 is a block diagram illustrating an example of a cabin pressure control system (CPCS), according to one or more techniques of this disclosure.

Some types of all-electric cabin pressure control systems (CPCS) may be configured to implement various techniques to provide "manual" control in response to a fault in the automatic control portion of the CPCS. In a first example, after a fault in the automatic pressure control system, the outflow valve (OFV) may remain in its last position because of the gear box design. A second or third manual controlled motor on the OFV may be operated by a switch in the flight deck to open or close the OFV.

When the OFV is in a fixed position, the actual cabin altitude can drift or fluctuate as a result of fresh air inflow changes, airplane altitude changes, engine power setting changes or other conditions that can change the cabin altitude. For example, for a vehicle set to maintain a given course and altitude, the autopilot may make regular small changes in the engine power settings. Small changes in the power settings may cause the bleed air pressurization system, or a separate air compressor, used to pressurize the cabin to change how the system pressurizes the cabin. When the automatic portion of the CPCS is operating, the CPCS may change the motor position that adjusts the OFV position to compensate for these power setting, or other changes in the cabin air pressure. However, with a fixed manual control system, the operator may have to activate the manual control of the valve frequently, which may distract the operator from other aspects of operating the vehicle.

The cabin altitude expresses the cabin pressure in terms of an equivalent atmospheric altitude. For example, a cabin altitude of zero (i.e., sea level) means that the cabin pressure is equal to the atmospheric pressure at sea level, which is approximately 14.7 psia, 1.013 bar, 101.3 kilopascals, or 760 mmHg. A cabin altitude of 5,000 feet means that the cabin pressure is equal to the atmospheric pressure at an altitude of 5,000 feet, which is approximately 12.2 psia, 0.841 bar, 84.1 kilopascals, or 631 mmHg.

A CPCS may include redundant systems and safety features to prevent over pressurization or under pressurization of the cabin. In some examples, a vehicle may have back-up electronics, two outflow valves, one or more safety valves, and may have fault detection to switch the automatic control to manual control by the flight crew. Additional example details of redundant CPCS are described in commonly assigned U.S. Patent Application Publication Number 2020/0298978, entitled "Dissimilar Microcontrollers for Outflow Valve," filed on Mar. 22, 2019, U.S. Patent Application Publication Number 2020/0298979, entitled "Cabin Pressure Control System with All-Electric OFV, Using Dis-Similar Manual Control that Performs Cabin Altitude Hold Function," filed on Feb. 28, 2020, the entire contents of each of which are incorporated herein by reference.

For existing cabin pressure control systems, after a fault of the automatic control channel, a backup manual control mode is invoked. In some cases, there are two automatic control channels, such that only after two faults, a backup manual control mode is invoked. Traditional all-electric CPCS, utilize a manual control where the pilot can directly "manually" control the position of an outflow valve (OFV) via a cockpit switch. This method requires significant pilot workload because the cabin altitude will "drift" away from the initial cabin altitude condition because there is no closed-loop control. Moreover, this method requires the pilot to manually open and close the OFV to raise or lower the cabin altitude—resulting in uncomfortable cabin rate fluctuations.

Alternatively, the pilot can utilize a selector control unit and select that the target cabin altitude be raised or lowered or "held" by a closed-loop backup manual controller, such as described in U.S. Patent Application Publication Number 2020/0298979, entitled "Cabin Pressure Control System with All-Electric OFV, Using Dis-Similar Manual Control that Performs Cabin Altitude Hold Function," filed on Feb. 28, 2020, U.S. patent application Ser. No. 17/326,655, entitled "Cabin Pressure Control System With Selection Of Rate Of Change," filed on May 21, 2021, the entire contents of each of which are incorporated herein by reference. However, this adjustable hold type of a manual controller utilizes a single cabin pressure sensor, and does not consider the positive differential pressure limit (e.g., between the cabin pressure and ambient pressure outside the vehicle)— relying on the pneumatic pressure relief valve (PRV) to limit the differential pressure.

If the positive differential pressure limit is exceeded using the closed-loop manual controller (with only one pressure sensor), the pneumatic safety valve is required to operate. However, in some situations, the pneumatic safety valve may have a latent defect and may not operate when required. The existing rudimentary open-loop manual control schemes are usually not utilizing a micro controller and do not allow built-in testing to detect a fault. Manual controls utilize a microcontroller and can perform built-in testing and inform the crew of a fault. However, these microcontroller-based manual controls do not transmit additional fault information, and so can only identify if there is a fault or not, but not what kind of fault. Further, there are faults that result in loss of manual control, and also other faults which are not necessarily critical to this flight. These non-critical type of faults should still be indicated to the flight crew to ensure that maintenance will be promptly performed within the next few flights. An example of this type of fault is a differential pressure limit and/or altitude limit functional fault, where the system does not have the differential pressure limit and/or altitude limit override function, but can still allow flight so long as the auto channel is operable and the backup manual control is still available.

In addition, the existing implementations of highly functional manual controls utilize an "analog" output of the cabin pressure (Pc) signal, requiring the customer to utilize analog-to-digital conversion and perform conversions to engineering units of cabin pressure, cabin pressure rate of change, differential pressure, and various other outputs.

Finally, with some CPCS, only one pneumatic pressure relief valve is included in the system—a backup in case the main automatic control system fails. However, the pressure relief valve does not have built-in test capabilities (it is a simple mechanical part), so the flight crew does not know if it has failed or not (latent/dormant failure). Therefore, the pressure relief valve has to be tested periodically to ensure its function has not failed. This requires down time of the airplane, and results in a maintenance cost. In this case, it would be advantageous to have an additional electronic means to limit the positive differential pressure that is fully redundant to the automatic control system and the pneumatic pressure relief valve to prevent periodic testing of the pressure relief valve or reduce the frequency of the test. In a single auto channel CPCS, this situation (dormant failure of positive pressure relief valve) can sometimes be a barrier to certification when considering the FAA Advisory Circular "Arsenal" to AC 25.1309 (AC-AMJ 1309) when reduction of testing is desired of potentially latent/dormant failures.

The techniques described in this disclosure may provide one or more technical advantages that realize one or more practical applications. For example, a main manual monitor controller (MMC) microcontroller unit (MCU) can receive three independent sources for differential pressure to calculate a differential pressure (e.g., between cabin pressure and ambient air pressure to a vehicle). For example, the main MMC MCU can receive differential pressure from a sensor MCU, a differential pressure sensor, and calculate a differential pressure from cabin pressure sensor input and altitude data, such as altitude data received via an Aeronautical Radio INC. (ARINC) data bus (hereinafter an A429 data bus). This provides an extra level of differential pressure protection that was not available during manual control in previous existing manual controls.

Using secondary input for air data computer (e.g., via an A429 data bus) and its own dissimilar cabin pressure sensor, provides independence from an automatic control system's differential pressure limiting, which primarily uses air data computer inputs and its own type of cabin pressure sensor. Further, the main MMC MCU can compute cabin altitude, cabin altitude rate of change, and/or cabin-to-ambient differential pressure using one of the above sources of differential or cabin pressure data. The main MMC MCU can transmit the cabin altitude, cabin altitude rate of change, and differential pressure to the aircraft via the A429 data bus.

Computing the cabin altitude, cabin altitude rate of change, and/or cabin-to-ambient differential pressure provides an independent (relative to the automatic control system) "monitoring" output of these parameters to the vehicle's crew alert system (CAS) in case there is an error from the automatic control system generated signals.

Advantageously, providing the independent "monitoring" of the cabin altitude, cabin altitude rate of change, and/or cabin-to-ambient differential pressure removes the need for the avionics to receive an "analog" signal from the main MMC MCU (with hardware analog-to-digital conversion and filtering) and perform its own pressure to altitude conversion, and then create an altitude rate-of-change value, and then compute the differential pressure using an air data computer input.

The MMC can compute the "differential pressure limit" and/or "altitude limit" condition to be true if both the sensor MCU and main MMC MCU both independently compute that the differential pressure data and/or altitude data is greater than or equal to an unsafe threshold. The differential pressure limit and/or altitude limit condition is output as a discrete signal from both MCUs, and the signals are "ANDed" together in a hardware circuit that serves to both shutdown an automatic motor controller (AMC) and stop continued erroneous valve opening via a cross channel signal; enable the MMC motor driver to drive its own motor via a hardware enable circuit; and utilize MMC backup motor commands to operate the backup motor closed to close the outflow valve (OFV) and reduce the cabin altitude to a safe value.

If, however, one of the sensor MCU and main MMC MCU compute that the differential pressure data and/or altitude data is less than an safe threshold, the main MMC MCU may compare the differential pressure data and/or altitude data to a converted differential pressure data (converted from data received via A429 data bus) and/or altitude data. These signals are "ANDed" together in the hardware circuit to follow the above steps of shutting down the AMC, enabling the MMC motor driver, and utilizing MMC backup motor commands.

Because there are multiple sources for the main MMC MCU to compute the differential pressure, and because the main MMC MCU and the sensor MCU are independent, performing the differential pressure shut-off function of the AMC and OFV open function with the MMC is based on a high integrity decision. This may prevent erroneous opening of the OFV, causing depressurization. In addition, because the MMC unit contains its own cabin pressure sensor, the cabin pressure sensor can also be used by the MMC unit to limit the cabin altitude in the event that the remaining independent sources of differential pressure agree to open the OFV and depressurize the cabin beyond a safe limit.

In some applications, it may be possible to disable the AMC motor controller, and not drive the OFV close using the AMC. In this way, technical aspects remove the reliance on the single pneumatic pressure relief valve (which may have a dormant failure) to limit the positive differential pressure in the event that the automatic control system erroneously increases the positive differential pressure beyond a safe limit.

In this disclosure, any space within an aircraft, or similar vehicle, may be monitored and controlled by a CPCS of this disclosure. Some examples of spaces within a vehicle may include an aircraft cabin, a cockpit, control booth, a hold or storage space of a vehicle, and similar spaces. In some examples, a vehicle cabin may include seating for a passengers as well as locations for cargo. In some examples a cockpit or control booth may be where a vehicle operator, such as a flight crew, controls the operation of the vehicle. In this disclosure, any reference to controlling cabin pressure may also refer to controlling cockpit pressure, or any other space within a vehicle, unless otherwise specifically noted.

FIG. 1 is a block diagram illustrating an example of a CPCS according to one or more techniques of this disclosure. CPCS 100 may be part of an aircraft such as airplane, a helicopter, or a weather balloon. Alternatively, CPCS 100 can be part of a space vehicle such as a satellite or spaceship. Alternatively, CPCS 100 can be part of a vessel such as a ship, boat, and so on. Alternatively, CPCS 100 can be part of an automobile, train, and so on. Although the systems of this disclosure are described in the context of aircraft, the systems of this disclosure may apply to any type of vehicle.

Figure 2:
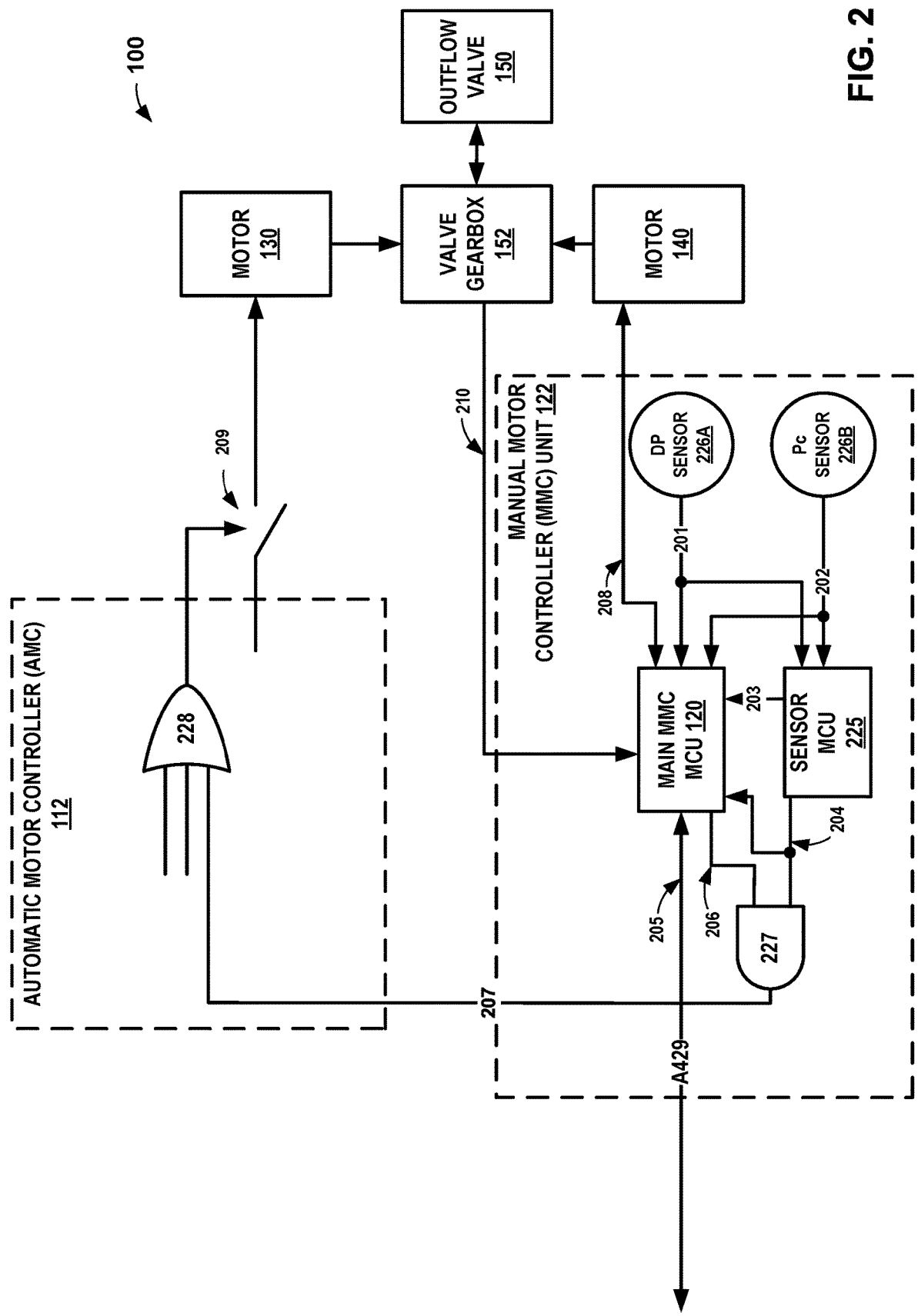
FIG. 2 is a conceptual block diagram of the system architecture of a CPCS, according to one or more techniques of this disclosure.

In the example of FIG. 1, cabin pressure control system (CPCS) 100 controls and monitors the pressure of a fluid in a cabin, ambient pressure to the cabin (e.g., outside the cabin), and/or a differential pressure between the cabin and ambient pressures. The cabin may be the passenger compartment of a vehicle, such as the galley and/or cockpit of an aircraft, which is filled with air. Air pressure is related to air density, so human lungs work harder at lower air pressures, as compared to higher air pressures, to ingest enough oxygen. Thus, for the occupants of the cabin, it is important to maintain a sufficiently high fluid pressure (e.g., air pressure). CPCS 100 can also include one or more sensors for sensing the pressure of the fluid in the cabin, or for sensing the atmospheric (ambient) pressure outside of the cabin. The pressure sensors may send one or more pressure sense signals 126 to manual monitor controller (MMC) unit 122, automatic control unit 112, and sensor MCU (not shown in FIG. 1). In some examples, pressure sense signals 126 may be implemented by tubing, or similar structure, that may connect the cabin directly to a pressure transducer, which converts the pressure to an electrical signal. In other examples, a pressure sensor may measure the cabin pressure and send an electrical signal indicating the measured pressure to MMC unit 122, automatic control unit 112, and sensor MCU. In yet other examples, the pressure sense signals 126 may include differential pressure, that is an independent pressure sense of cabin-to-ambient differential pressure by collecting pressure data from inside a cabin and ambient pressure outside, e.g. at a first port in the cabin and at a second port outside the cabin, as discussed below. A cabin pressure sensor (Pc sensor 226B; FIG. 2) and a differential pressure (DP) sensor (DP sensor 226A; FIG. 2) may each transmit cabin pressure data and differential pressure data (pressure sense 126), respectively, to both main MMC MCU 120 and sensor MCU independently, as discussed below.

CPCS 100 may also receive valve position signals 154 from valve position circuitry within valve gearbox 152 for sensing the position of outflow valve (OFV) 150. The airplane may also include an inflow valve for allowing fluid to flow into the cabin, e.g. from an engine bleed air system or other such system (not shown in FIG. 1).

Microcontroller 110, via automatic control unit 112, automatically controls the pressure of the fluid in the cabin based on a sensed cabin pressure. Automatic control unit 112 may operate with a closed feedback loop. Microcontroller 110 can receive a signal indicating the cabin pressure and determine whether to open or close OFV 150 based on the signal. Microcontroller 110 may be configured to deliver signals to a motor driver that controls the operation of first motor 130. Additional example details of motors for controlling outflow valve are described in commonly assigned U.S. Pat. No. 6,979,257, entitled "Cabin Pressure Control Method and Apparatus Using All-Electric Control Without Outflow Valve Position Feedback," issued on Dec. 27, 2005, the entire contents of which are incorporated herein by reference.

Microcontroller 110 can also receive a pressure sensor signal 126 indicating the pressure of the fluid and control motor 130 based on the pressure sensor signal 126. In examples in which the pressure sensor signal indicates that the cabin pressure is greater than an upper threshold, microcontroller 110 can control motor 130 to open OFV 150 to release fluid and lower the cabin pressure. In examples in which the pressure sensor signal indicates that the cabin pressure is less than a lower threshold, microcontroller 110 can control motor 130 to close OFV 150 to prevent the release of fluid from the cabin. Microcontroller 110 can also be coupled to an avionics system of the aircraft to receive control signals from the avionics.

Main MMC microcontroller unit (MCU) 120, of MMC unit 122, controls the pressure of the fluid in the cabin based on user inputs using the manual control panel 160. Manual control panel 160 may include any type of electrical selector switch configured to receive user input by turning a knob and/or touching a screen. In some examples, CPCS 100 may include a first selector switch that allows for a user to select to hold the cabin, increase or decrease cabin pressure by selecting a climb or descent rate, or open and close the valve by selecting respective options. CPCS 100 may also include a second switch that allows the user to select a dump operation, which may include a fast decrease in cabin pressure. MMC unit 122 can open or close OFV 150 based on the status of the first switch. MMC unit 122 may open the OFV 150 in response to detecting that the user has actuated the dump switch. MMC unit 122 may be configured to refrain from driving motor 140 in response to detecting that manual control panel 160 does not indicate that the user selected manual operation. MMC unit may enable control of motor 140 to adjust OFV 150 through main MMC MCU 120 based on pressure sense data and A429 altitude data received via A429 data bus.

In some examples, microcontroller 110 and MCU 120 may include computer readable storage in the form of a memory. In other examples, microcontroller 110 and MCU 120 may also be operatively connected to a memory external to microcontroller 110 or MCU 120 (not shown in FIG. 1). Either internal or external memory may include programming instructions for the processing circuitry within microcontroller 110 and MCU 120. The memory may also store and retrieve data, values, flags, setpoints, etc. that may be used by microcontroller 110 and MCU 120.

A type of microcontroller 110 may be different than a type of MCU 120 to reduce the likelihood of a common failure for microcontroller 110 and MCU 120 for the same common reason, such as manufacturing process defect, an actual design defect, or from an external influence such as exposure to temperature, radiation, vibration, or power interrupts. The type of microcontroller 110 refers to the manufacturer, the model number, the design, the manufacturing facility, the software compiler, the operating system, pin count, logic family (e.g., complementary metal-oxide-semiconductor (CMOS) or transistor-transistor logic (TTL)), and/or the register size (e.g., eight or sixteen bits) of microcontroller 110. Thus, the manufacturer or brand name of microcontroller 110 may be different than the manufacturer or brand name of MCU 120. Additionally or alternatively, the operating system of microcontroller 110 may be different than the operating system of MCU 120. In some examples, microcontroller 110 can operate independently of MCU 120 so that if one of microcontroller 110 and MCU 120 fails, the remaining microcontroller can still control outflow valve 150. Independent operation can include microcontroller 110 and MCU 120 having separate power supplies, separate pressure sensors, separate circuit boards, and/or galvanic isolation between microcontroller 110 and MCU 120.

In some examples, MCU 120 receives a different power supply than microcontroller 110 to reduce the likelihood of a common failure for microcontroller 110 and MCU 120. Different power supplies for each of microcontroller 110 and MCU 120 can reduce the likelihood that both of microcontroller 110 and MCU 120 fail at the same time, for the same common reason, such as a manufacturing or design defect of the power supply electrical device itself, or a design implementation defect of the integrated electrical design, or an external influence such as temperature exposure. The power supplies may be independent of each other by, for example, using different power sources (e.g., different batteries or generators) and different aircraft supplied power buses.

Motors 130 and 140 are configured to control the position of OFV 150. Each of motors 130 and 140 may be able to open or close OFV 150. In some examples, motor 130 includes a brushless direct-current (BLDC) motor, and motor 140 includes a brushed direct-current (BDC) motor. However, either of motors 130 and 140 may include a BLDC motor, a BDC motor, a stepper motor, and/or an inductive motor. Each of motors 130 and 140 can control OFV 150 through a single, shared actuator or valve gearbox 152. Valve gearbox 152 may be configured as a differential gear box such that either or both of motors 130 and 140 may control the position of OFV 150.

The motor drive electronics for motor 130 may be separate and dissimilar from the motor drive electronics for motor 140 to reduce the likelihood that both motor drive electronics fail at the same time. For example, the type, brand, design, and other characteristics of the motor drive electronics for motor 130 may be different than the type, brand, design, and other characteristics of the motor drive electronics for motor 140. The motor drive electronics may include a multiphase inverter for delivering power to motor 130 and/or motor 140.

OFV 150 can release fluid from the cabin based on the state of OFV 150. For example, OFV 150 can include a butterfly valve that can rotate to increase or decrease the fluid flow rate through OFV 150. OFV 150 may be positioned within the bulkhead of an aircraft and may be in flow communication with the cabin air and the outside ambient atmosphere. A position sensor in valve gearbox 152 may sense the position of OFV 150. In other examples, position sensor near OFV 150 can sense the position of OFV 150 and deliver a signal 154 to microcontroller 110 and/or 120.

MMC unit 122 of CPCS 100 may include a closed-loop system to adjust the cabin pressure or adjust the cabin pressure rate of change based on a feedback pressure signal when in manual mode. The manual mode closed-loop system is independent from the pressure control system in automatic control unit 112. Manual control panel 160 may include an electric selector switch configured to provide a number of (e.g., three) electrical connections to control electric motor 140 and thereby control OFV 150. The processing circuitry of MMC unit 122, i.e. main MMC MCU 120, may be configured to receive data transmitted along the electrical connections, where the data may codify the electrical selector switch input into a specific command or mode of operation. The processing circuitry of MMC unit 122, i.e. main MMC MCU 120, may be configured to receive a pressure sense signal 126 indicating a pressure of the cabin, ambient air, and/or a differential pressure between the two, all via monitoring circuitry 124. Monitoring circuitry 124 may contain circuitry configured to convert the pressure sense signal 126 into an electrical signal, pressure limiting circuitry, and an override function to ensure cabin pressure does not drop below a predetermined threshold. Further, main MMC MCU 120 may independently receive altitude data from a A429 data bus. Main MMC MCU 120 may convert the altitude data received from A429 data bus to ambient pressure data and/or cabin pressure data using techniques commonly known in the art.

In response to the alternate position mode switch in manual control panel 160 being set to the manual position, and the electrical selector switch in manual control panel 160 resting in the hold position, MCU 120 may determine the commanded target first pressure of the cabin when the electric switches were set to the manual and hold positions using a typical MCU operational cycle by cycle sample (of the pressure sense signal 126) and then hold (of the pressure signal 126) method. Main MMC MCU 120 may send electric signals to motor driver circuitry for motor 140 to control motor 140 to maintain the pressure of the cabin at the set pressure by controlling the position of OFV 150. MCU 120 may be configured to maintain the cabin at the first pressure (targeted pressure) within a threshold range, such as plus or minus 0.26 kilopascals, or in some examples, plus or minus 70 feet of altitude.

In response to determining that the alternate position mode switch in manual control panel 160 is set to the manual position, and the electrical selector switch in manual control panel 160 is resting in the hold position, MCU 120 may determine the commanded target first pressure of the cabin. MCU 120 can determine the pressure when the electric switches were set to the manual position and to the hold position using a typical MCU operational cycle by cycle sample (of the pressure sense signal 126) and then hold (of the pressure signal 126) method. MCU 120 may send electric signals to motor driver circuitry for motor 140 to control motor 140 to maintain the pressure of the cabin at the set pressure by controlling the position of OFV 150. MCU 120 may be configured to maintain the cabin at the first pressure (targeted pressure) within a threshold range, such as plus or minus 0.26 kilopascals, or in some examples, plus or minus 70 feet of altitude.

In response to the alternate position mode switch in manual control panel 160 being set to the manual position, and the electrical selector switch in manual control panel 160 resting in the slow climb position, MCU 120 may determine the predetermined commanded target first pressure rate of change of the cabin when the electric switches were set to the manual and slow climb positions. MCU 120 can use a typical MCU operational cycle-by-cycle sample (of the pressure sense signal 126) and then rate control (of the pressure signal 126) method. MCU 120 may send electric signals to motor driver circuitry for motor 140 to control motor 140 to maintain the predetermined pressure rate of change of the cabin at the set pressure by controlling the position of OFV 150. MCU 120 may be configured to maintain the cabin pressure rate of change at the first predetermined pressure rate of change (targeted pressure rate of change), such as an increase of approximately five hundred feet per minute. MCU 120 can keep the decrease rate in pressure within a threshold range, such as plus or minus 0.27 kilopascals per minute, or in some examples, plus or minus 75 feet per minute of altitude change rate.

In the same manner, in response to the alternate position mode switch in manual control panel 160 being set to the manual position, and the electrical selector switch in manual control panel 160 resting in the fast climb position, MCU 120 may determine the predetermined commanded target second pressure rate of change of the cabin when the electric switches were set to the manual and fast climb positions. MCU 120 can use a typical MCU operational cycle by cycle sample (of the pressure sense signal 126) and then rate control (of the pressure signal 126) method. The target rate of increase of the fast climb position setting may be approximately one thousand feet per minute.

In the same manner, slow descent and fast descent selector switch position and manual switch position may maintain the cabin pressure rate of change at the third and fourth predetermined pressure rates of change (targeted pressure rates of change). The target rate of increase of the slow descent position setting may be approximately three hundred feet per minute. The target rate of increase of the fast descent position setting may be approximately seven hundred feet per minute. These rates of changes are described merely as examples, and other rates of change can be used in addition or as an alternative to the rates described herein.

In response to the alternate position mode switch in manual control panel 160 being set to the manual position, and the electrical selector switch in manual control panel 160 resting in the OFV open position, MCU 120 may determine the predetermined commanded motor voltage and polarity when the electric switches were set to the manual and OFV open positions using a typical MCU operational control of the pulse width modulation (PWM) control method. MCU 120 may send electric signals to motor driver circuitry for motor 140 to control motor 140 to maintain the predetermined motor voltage and polarity at the set voltage and polarity by controlling the speed and direction of OFV 150. MCU 120 may be configured to maintain the commanded motor voltage at the first predetermined motor voltage within a threshold range, such as plus or minus 0.3 volts DC. MCU 120 may also monitor the pressure sensor 126 to compare the actual cabin pressure, ambient pressure, and/or differential pressure against a predetermined cabin pressure, and/or ambient pressure, and/or differential pressure, and set the commanded motor voltage to zero volts DC, when the actual cabin pressure is less than the predetermined cabin pressure, such as a pressure associated with an altitude of 13,500 feet.

In response to the alternate position mode switch in manual control panel 160 being set to the manual position, and the electrical selector switch in manual control panel 160 resting in the OFV close position, MCU 120 may determine the predetermined commanded motor voltage and polarity when the electric switches were set to the manual and OFV close positions using a typical MCU operational control of the pulse width modulation (PWM) control method. MCU 120 may send electric signals to motor driver circuitry for motor 140 to control motor 140 to maintain the predetermined motor voltage and polarity at the set voltage and polarity by controlling the speed and direction of OFV 150. MCU 120 may be configured to maintain the commanded motor voltage at the first predetermined motor voltage within a threshold range, such as plus or minus 0.3 volts DC.

The system of this disclosure may include a cabin altitude "hold," cabin altitude rate of change, and OFV open and OFV closed functions after failure of automatic CPCS control, using a separate, dissimilar control means from automatic control (such as the MMC unit). Other examples of all-electric systems may not have a hold, cabin altitude rate of change, and OFV open and OFV closed functions when in manual mode, or may have more complex controls in the flight deck to select cabin altitude or cabin altitude rate of change during semi-automatic control.

The system of this disclosure may provide technical benefits compared to existing systems. For example, an operator may not have to divert attention to maintaining the cabin altitude because the closed-loop feature of the manual system may be configured to hold the cabin altitude or command a change to the cabin altitude even without user interaction. Furthermore, the system uses a simple flight deck selector switch (what many all-electric systems already include), instead of complex flight deck controls to manually select the cabin altitude or cabin altitude rate of change, which may have cost and weight benefits.

Cost benefits may also result from a selector panel (e.g., an electrical selector switch), no additional weight (which has a fuel savings cost impact), and no added engineering costs to develop the flight deck selector panel. Finally, the system of this disclosure may have cost, weight, and reliability advantages over electro-pneumatic systems that may include a hold and cabin pressure rate of change function.

FIG. 2 is a block diagram illustrating details of an example implementation of a manual monitor controller unit as part of a CPCS according to one or more techniques of this disclosure. CPCS 100 is an example implementation of CPCS 100 described above in relation to FIG. 1. Reference numbers in CPCS 100 that are the same as those in FIG. 1 above have the same functions and description. CPCS 100 includes AMC 112, MMC unit 122, motor 130, motor 140, outflow valve 150, and valve gearbox 152. MMC unit 122 may include main MMC MCU 120, a sensor MCU 225 (as discussed in FIG. 1), a DP sensor 226A, a cabin pressure (Pc) sensor 226B, an AND gate 227, and an A429 receiver/transmitter (A429 data bus).

Functions of MMC unit 122 may be included in an OFV or an OFV controller. In the example of FIG. 2, main MMC MCU 120 provides control commands to altitude limit motor 140 and outflow valve 150 via valve gearbox 152. MMC unit 122 may include processing circuitry similar to that described above in relation to FIG. 1. Main MMC MCU 120 may perform built-in test to detect invalid switch conditions of manual control panel 160. Further, main MMC MCU 120 may perform other built-in tests to detect that the actual cabin pressure data received from Pc sensor 226B is out of range.

In the example of FIG. 2, DP sensor 226A is a device with associated circuitry, and may independently sense the cabin-to-ambient differential pressure. For example, DP sensor 226A may include a first port and a second port. First and second ports may be configured to determine a pressure at a different location of the aircraft. For example, the first port may be located within the cabin and the second port may be located proximate to ambient air, such as at a location open to ambient air to the vehicle. The first port may be configured to obtain cabin air pressure data and the second port may be configured to obtain ambient air pressure data. DP sensor 226A may measure the pressure sense signal 126 within a first port of the cabin of a vehicle (e.g., an airplane, as so on) and at a second port at the vehicle to collect ambient pressure data, and convert the pressure data to a differential pressure data 201. Further, DP sensor 226A (or monitoring circuitry 124, with reference to FIG. 1) may convert differential pressure data 201 to a voltage (or other signal proportionally representative of cabin pressure) for use by the main MMC MCU 220, and also by the sensor MCU 225. DP sensor 226A may transmit differential pressure data 201 to both main MMC MCU 120 and sensor MCU 225 for independent verification.

Cabin pressure (Pc) sensor 226B is a device with associated circuitry, which measures air pressure within a cabin (i.e., cabin pressure 202) and converts it to a voltage (or other signal proportionally representative of cabin pressure) for use by the main MMC MCU 220, and also by the sensor MCU 225. Pc sensor 226B may include any type of pressure sensor. Pc sensor 226B is an example of Pc, described below in relation to FIG. 3.

A429 data bus may receive and transmit altitude data 205 of the vehicle to/from main MCU MMC 120. A429 data bus may receive an independent A429 input for airplane altitude and provide the independent airplane altitude to the main MMC MCU 120. Main MMC MCU 120 may compare this independent airplane altitude data 205 with the cabin pressure data 202 received by Pc sensor 226B for the computation of differential pressure. The independent altitude data 205 transmitted along A429 data bus can be independent from the main avionics data provided to the auto channel in case there is a loss of avionics outputs of the air data information. Further, A429 data bus may transmit cabin pressure parameters to the vehicle (e.g., automatic cabin pressure controller) for indications and warning; and, to provide additional manual fault data. The additional manual fault data can transmit which specific low-level faults exist, without having to only provide a binary fault signal: fault or not-fault. This allows the pilots and maintenance crew to make decisions whether to continue on with the existing flight and delay maintenance (e.g., maintenance of pressure sensors within the automatic cabin pressure controller) to a more convenient time.

DP sensor 226A differential pressure data 201 may be provided to both sensor MCU 125 and main MMC MCU 120, so that both components each receive the differential pressure data 201 and can validate differential pressure computation from the other component. For example, validating the differential pressure data 201 may include main MMC MCU 120 comparing differential pressure data 201 received from DP sensor 226A to differential pressure data 203 received from sensor MCU 225, which may be differential pressure data 201 that sensor MCU 225 received from DP sensor 226A. If sensor MCU 225 and main MMC MCU 120 differential pressure data values 201, 203 disagree (e.g., an absolute value between the difference between differential pressure data 201 and 203 do not satisfy a threshold numerical value, such as by exceeding the threshold numerical value), then main MMC MCU 120 may determine either the differential pressure data of main MMC MCU 120 or the differential pressure data of sensor MCU 225 as "invalid." In some examples, the processing circuitry (e.g., sensor MCU 125 and main MMC MCU 120 may determine a first set of differential pressure data, that may include either receiving the first set of differential pressure data from DP sensor 226A sensor or calculating that first set of differential pressure data based on the second set of cabin pressure data and first set of ambient pressure data.

Main MMC MCU 120 may also compute a differential pressure by collecting its own cabin pressure data 202 and subtracting a converted ambient air pressure data (not shown in FIG. 2). The converted ambient air pressure data may be converted from altitude data 205 received by main MMC MCU 120 from A429 data bus. For example, main MMC MCU 120 may derive its own ambient pressure data from A429 data bus altitude data 205. Main MMC MCU 120 may further determine differential pressure data (not shown in FIG. 2) by subtracting cabin pressure data 202 from the converted ambient pressure data. The differential pressure data may be the absolute value of cabin pressure data subtracted from ambient pressure data in units of psia. This calculated differential pressure data may be compared to differential pressure data 201 received from DP sensor 226A.

Main MMC MCU 120 may have three unique differential pressure data values: a first differential pressure data 203 received from sensor MCU 225 (received by sensor MCU 225 from DP sensor 226A); a second differential pressure data 201 received by main MMC MCU 120 from self-computing received differential pressure data 201 from DP sensor 226A; and a third differential pressure data value derived from subtracting ambient pressure data 202 (converted using altitude data 205 received from A429 data bus) from cabin pressure data 202 received from Pc sensor 226B.

Main MMC MCU 220 can validate all three differential pressure data values using the three differential pressure data values to "vote" for a high integrity result. For example, voting may include i) comparing differential pressure data 201 to differential pressure data 203 and, if the difference between the differential pressure data 201 and 203 does not satisfy a threshold, ii) comparing differential pressure data 201 calculated differential pressure data (calculated using altitude data 205). Further, if there is a loss of altitude data 205 from either A429 data bus or differential pressure data 203 from sensor MCU 225, main MMC MCU 120 can compare the remaining two differential pressure data values for agreement. For example, if main MMC MCU 120 does not receive altitude data 205 from A429 data bus, but main MMC MCU 120 does receive differential pressure data 203 from sensor MCU 225 and differential pressure data 201 received from DP sensor 226A, main MMC MCU 120 can compare the differential pressure data 203 and 201. If the received two differential pressure data 201, 203 values agree (e.g., an absolute value of the difference between the received two differential pressure values satisfy a numerical threshold value, such as the difference is equal to or less than the numerical threshold value), it can be assumed the received differential pressure data 201 and 203 values are correct, and if there is disagreement between the two received differential pressure data 201 and 203 values (e.g., an absolute value of a difference between the received two differential pressure values does not satisfy a numerical threshold value, such as the difference is greater than the numerical threshold value), then the differential pressure data 201 and 203 values may not be used in consuming controls and outputs.

Main MMC MCU 120 can use the calculated differential pressure data as a source of differential pressure data for limiting the differential pressure during manual adjustable rate or hold operations. For example, when motor 130 is disabled and AMC 112 no longer controls motor 130 to adjust outflow valve 150, and MMC unit 112 enables motor 140 to take over adjustment of outflow valve 150, main MMC MCU 120 can discern adjustment of outflow valve 150 based on the calculated differential pressure data. Advantageously, this provides an extra level of differential pressure protection previously unavailable in the art during manual control of cabin pressure operations. For example, receiving a second source for air information data (e.g., altitude data 205 via A429 data bus, differential pressure data via sensor MCU 225, and differential pressure data 201 via DP sensor 226A, and so on) in addition to cabin pressure data 202 received from Pc sensor 226B provides independence from receiving sole differential pressure data from automatic cabin pressure controller (e.g., ACPC 312 in FIG. 3).

In addition, main MMC MCU 120 can compute cabin altitude, cabin altitude rate of change, and cabin-to-ambient differential pressure (as discussed above) using cabin pressure data 202 and altitude data 205 received from A429 air data bus (such as using altitude data 205 to derive ambient pressure data) or using differential pressure data 201 received from DP sensor 226A or differential pressure 203 independently received sensor MCU 225, whichever is valid. Main MMC MCU 120 can transmit the computed cabin altitude data, cabin altitude rate of change, and differential pressure data to automatic cabin pressure controller (e.g., ACPC 312) or directly to the airplane avionics via A429 data bus. This provides an independent (relative to ACPC 312) "monitoring" output of these parameters to the airplanes crew alert system (CAS) in case there is an error from ACPC 312 generated signals. Consequently, this removes a need for the avionics to receive an "analog" signal from MMC unit 122 (with hardware analog-to-digital conversion and filtering) and perform its own pressure-to-altitude conversion, and then create an altitude rate-of-change value, and then compute the differential pressure using an air data computer input.

MMC unit 122 can compute the "altitude limit" condition to be true if both the sensor MCU 225 and main MMC MCU 120 both independently compute that the cabin altitude does not satisfy a cabin altitude threshold. The altitude limit condition (or the differential pressure limit) is output as a discrete signal in the form of altitude limit data 204 (which may also be differential pressure limit data 204) and altitude limit data 206 (which may also be differential pressure limit data 206) from each of sensor MCU 225 and main MMC MCU 220, respectively, and altitude limit data 204 and 206 (or differential pressure limit data 204 and 206) are "ANDed" together at AND gate 227, producing a cross channel output signal 207 received by AMC disable logic circuit 228, that serves to shut-down AMC 112 (and stop continued erroneous valve opening), disabling motor 130, via disable switch 209. Further, main MMC MCU 120 may enable a motor driver to drive its own motor 140 via a hardware enable circuit 208. Further, MMC 112 may use back up motor commands (e.g., stored in memory) to operate motor 140 to close outflow valve 150, via valve gearbox 152, and reduce the cabin altitude to a safe pressure value. MMC unit 122 may base operation of motor 140 to adjust outflow valve 150 on altitude data 205, cabin pressure data 202, and differential pressure data 201 and 203. Likewise, with the technical aspects of the present disclosure, the sensor MCU 225 and the main MMC MCU 120 can independently compute if the cabin-to-ambient differential pressure exceeds a safe level while MMC 122 operates motor 140.

As discussed above, because there are multiple sources for main MMC MCU 120 to compute the differential pressure, and because main MMC MCU 120 and sensor MCU 225 are independent, there is a very high-integrity decision to perform a differential pressure shut-off function of AMC 112 and outflow valve 150 open function (with the MMC). This will prevent erroneous opening of outflow valve 150, causing depressurization within the cabin. Also, because MMC unit 122 contains its own Pc sensor 226B, Pc sensor 226B can also be used by MMC unit 122 to limit the cabin altitude in the event that the differential pressure data 201 from DP sensor 226A and differential pressure data 203 from sensor MCU 225 agree to open outflow valve 150 and depressurize the cabin beyond a safe limit.

In some applications, it may be possible to disable AMC 112, and not drive the outflow valve 150 close using AMC 112 via motor 130. In this way, technical aspects of the present disclosure remove any reliance on a single pneumatic pressure relief valve (which may have a dormant failure) to limit the positive differential pressure in the event that the automatic control system erroneously increases the positive differential pressure beyond a safe limit.

MMC unit 122 may be configured to control outflow valve 150 via valve gear box 152 and altitude limit motor 140 based on commands received from a control panel (not shown in FIG. 2). For example, in response to a switch in control panel 360 (shown in FIG. 3) being set to a slow descent rate position (e.g., the digits 100), MMC unit 122 may be configured to control cabin altitude to descend the cabin altitude at the slow descent rate. In response to the switch being set to a fast descent rate position (e.g., the digits 011), MMC unit 122 may be configured to control the cabin altitude to descend the cabin altitude at the fast descent rate. In response to the switch being set to the slow climb rate position (e.g., the digits 101), MMC unit 122 may be configured to control the cabin altitude to climb the cabin altitude at a slow climb rate.

In response to the switch being set to the fast climb rate position (e.g., the digits 111), MMC unit 122 may be configured to control the cabin altitude, via control of motor 140 adjusting outflow valve 150, to climb the cabin altitude at a fast climb rate. For the slow and fast climb positions, MMC unit 122 may be configured to maintain the cabin altitude below a predetermined (e.g., fourteen to fifteen thousand feet). In response to the switch being set to the fast OFV close position (e.g., the digits 001), MMC unit 122 may be configured to control the OFV to move rapidly towards the closing direction. In response to the switch being set to the fast OFV open position (e.g., the digits 010), MMC unit 122 may be configured to control the OFV to move rapidly towards the opening direction until the cabin altitude reaches a limited value. Thus, MMC unit 122 may encode a hold command, a rate of change command, or manual adjust command for outflow valve 150.

The circuitry of MMC unit 122 hosts a pressure transducer (not shown in FIG. 3) and performs the altitude limit output and altitude limit override logic when the cockpit altitude exceeds a predetermined value (e.g. 15,000 feet). Thus, MMC unit 122 has its own power supply to support this function as described above in relation to FIG. 3.

In the event of an altitude limit event, MMC unit 122 provides a signal 207 to the automatic control unit 112. The altitude limit event signal may disable the automatic motor control of motor 130 via logic circuit 229 and disable switch 209. MMC unit 122 also drives the manual altitude limit motor 140 closed to limit further depressurization. The altitude limit closing speed may be "tuned" to limit the initial overshoot to the altitude limit set-point and then "regulate" to that set-point.

MMC unit 122 may be configured to perform manual hold, manual slow climb, manual fast climb, manual slow descent, manual fast descent, manual OFV open, or manual OFV close or DUMP of OFV 150 if the flight deck mode switches in manual control panel 160 of user control panel 360 are set to MAN, and the selector switch of user control panel 360 is set to hold, slow climb, fast climb, slow descent, fast descent, OFV close or OFV open; or DUMP. During MAN-OFV open control or MAN-OFV close control, OFV 150 is opened or closed to a scheduled motor speed. The first few seconds of MAN-OFV open control or MAN-OFV close control may be a slow motor speed, then main MMC MCU 120 may be configured to command the remaining valve opening or closing at a higher motor speed. One reason for the slow-to-fast schedule is to limit the initial pressurization/depressurization rate prior to ultimately closing/opening outflow valve 150.

If required, altitude limit can override the OFV open or slow climb or fast climb or DUMP function and limit the cockpit altitude. If the flight is above 15,000 feet, for example, after an initial overshoot the cockpit altitude may be limited to 15,000 feet, which is the US regulatory limit above which passengers require oxygen. In other examples, altitude limit override logic (not shown in FIG. 2) can be utilized to allow the DUMP function to completely open the OFV, even when the aircraft is above the 15,000 ft altitude limit threshold.

Figure 3:
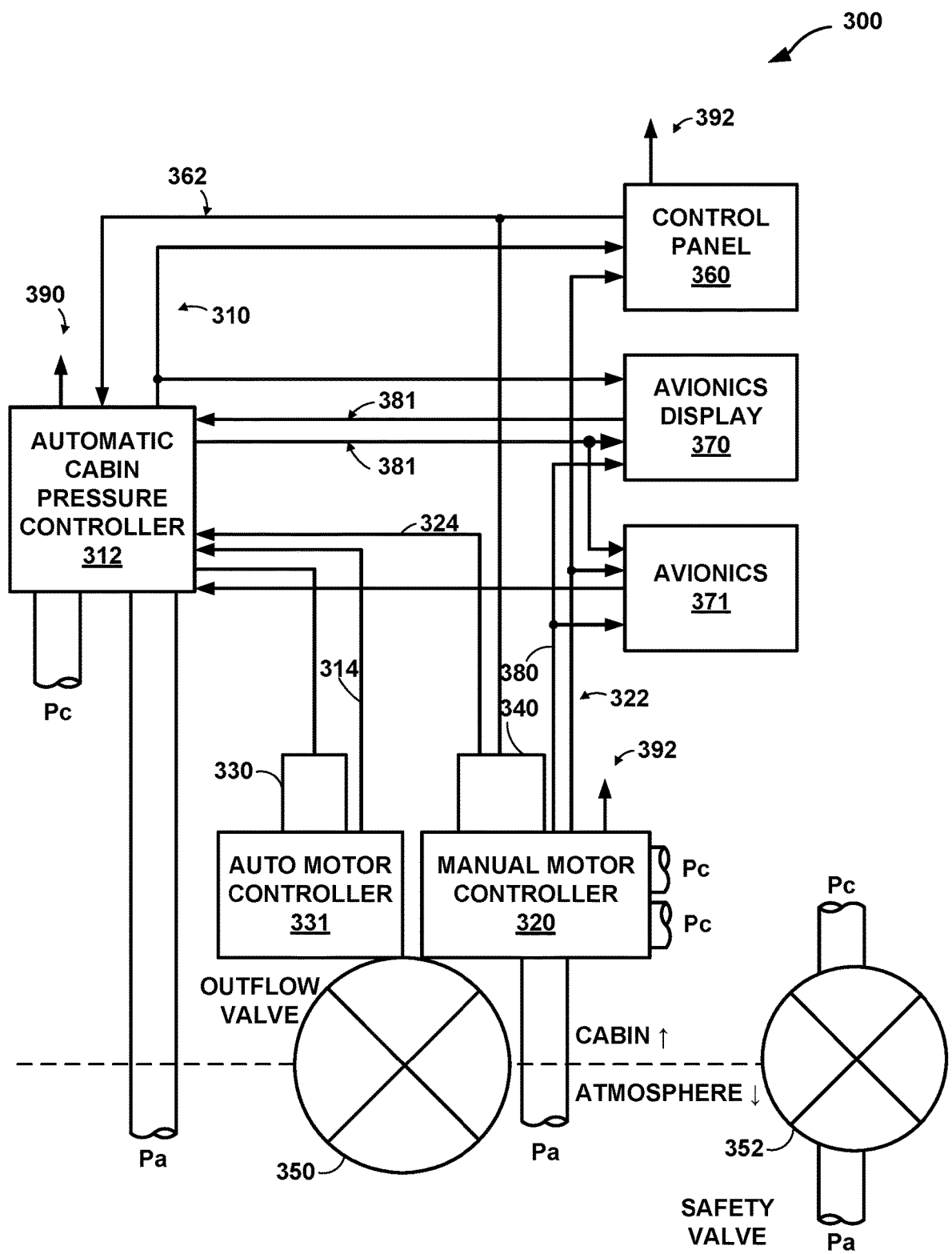
FIG. 3 is an alternate perspective of a conceptual block diagram of the system architecture of a CPCS, according to one or more techniques of this disclosure.

FIG. 3 is a conceptual block diagram of the system architecture of a CPCS, in accordance with some examples of this disclosure. CPCS 300 includes automatic control unit 312 and MMC unit 320, motors 330 and 340, outflow valve 350, safety valve 352, user control panel 360, and avionics display 370. User control panel 360 may include manual control panel 160 described above in relation to FIG. 1.

In the example of FIG. 3, automatic cabin pressure controller (ACPC) 312 receives power from power supply 390, which may be separate from power supply 392 for MMC unit 320 and control panel 360. ACPC 312 also receives manual operation signal 362 from control panel 360, position signal 314 from the actuator that drives outflow valve 350, and altitude limit signal 324, and sensed pressure signal 380 (e.g., A429 data bus, with reference to FIG. 2) from MMC unit 320. Further, data transmitted via A429 data bus 381 (which may include altitude data, and so on, as discussed in FIG. 2) can be transmitted to/from ACPC 312 to/from avionics display 370. ACPC 312 can output fault signal 310 to control panel 360 and avionics display 370 in response to detecting a fault in ACPC 312 or motor 330. ACPC 312 may receive signals indicating the cabin pressure (labeled "Pc") and the atmospheric pressure (labeled "Pa"). ACPC 312 can also control outflow valve 350 through motor 330 that is connectively coupled to automatic motor controller 331 (e.g., AMC unit 112).

Manual motor controller (MMC) unit 320 receives power from power supply 392, which may be the same power supply received by control panel 360, and manual operation signal 362 from control panel 360. MMC unit 320 can output fault signal 322 to control panel 360, avionics display 370, and/or avionics 371 in response to detecting a fault in MMC unit 320 or motor 340. MMC unit 320 may receive two independent signals indicating the cabin pressure (labeled "Pc"), a signal indicating ambient pressure (labeled "Pa"), and can control outflow valve 350 through motor 340. For example, as discussed in FIG. 2, MMC unit 320 may include a sensor MCU 225 and main MMC MCU 120 and may each receive differential pressure data 201 and cabin pressure data 202 from each of DP sensor 226A and Pc sensor 226B, respectively. Sensor MCU 225 and main MMC MCU 120 are not shown in FIG. 3 for ease of illustration.

Figure 4:
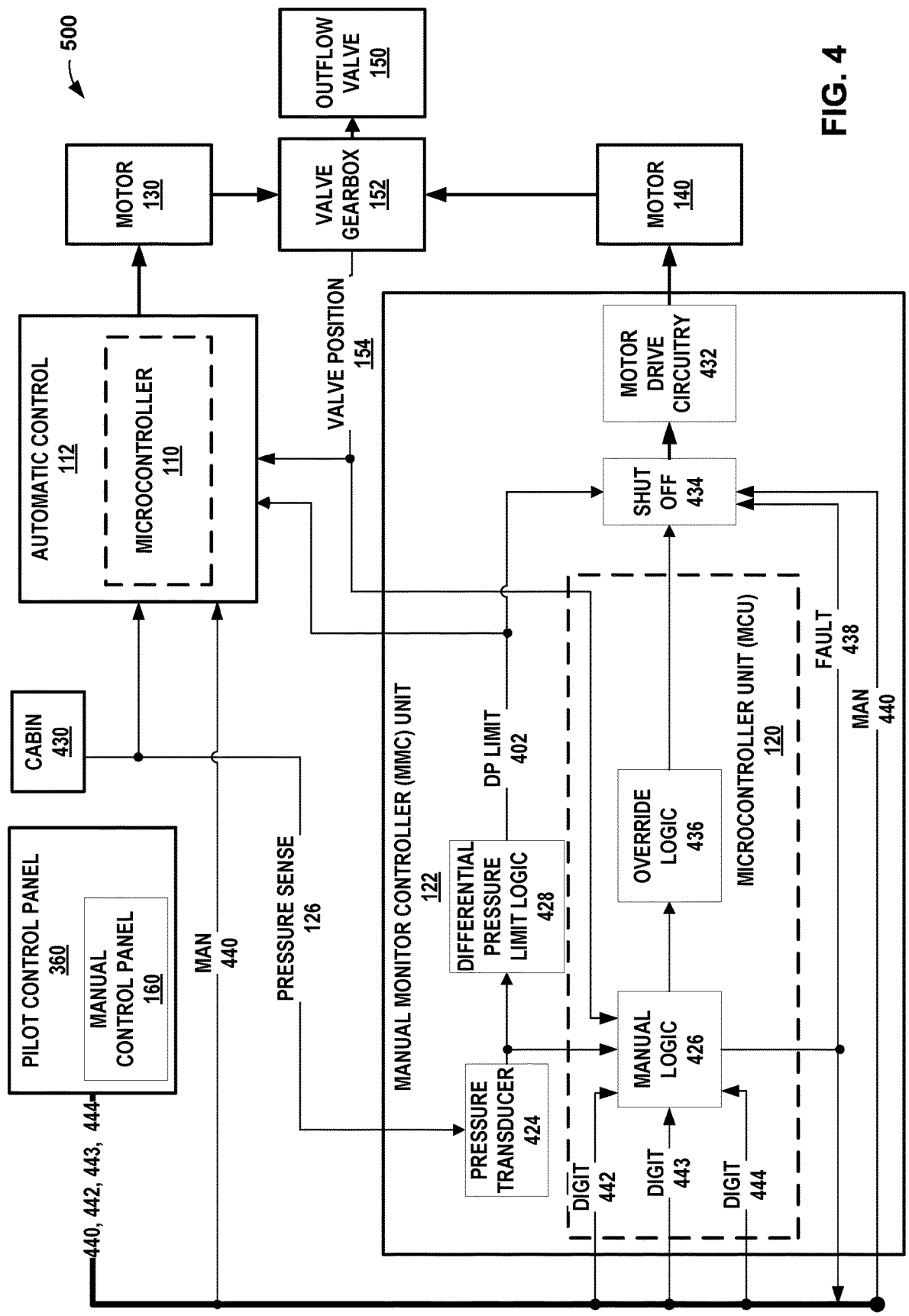
FIG. 4 is a block diagram illustrating details of an example implementation of a manual monitor controller unit as part of a CPCS, according to one or more techniques of this disclosure.

FIG. 4 is a block diagram illustrating details of an example implementation of a manual monitor controller unit as part of a CPCS according to one or more techniques of this disclosure. CPCS 400 is an example implementation of CPCS 100 described above in relation to FIG. 1. Reference numbers in CPCS 400 that are the same as those in FIGS. 1-3 above have the same functions and description.

Functions of MMC unit 122 may be included in an OFV or an OFV controller. In the example of FIG. 4, MCU 120 has manual control logic 426 that performs the input processing of input signals from manual control panel 160, pressure transducer 424, differential pressure threshold detection (which may also include altitude limit threshold detection), a built-in test unit (not shown in FIG. 4) and provides control commands to outflow valve 150 via motor 140. Pressure transducer 424 may house or be proximate to sensor MCU 125, 225, DP sensor 226A, and Pc sensor 226B. Further, pressure transducer 424 may receive pressure sense 126 from at least one of DP sensor 226A and Pc sensor 226B. Manual control logic 426 may include processing circuitry similar to that described above in relation to FIG. 1. Pressure transducer 424, differential limit logic 428 (which may further include altitude limit logic; hereinafter differential limit logic 428 may further include altitude limit logic), and differential pressure limit override logic 436 (hereinafter may further include altitude limit override logic), may be examples of circuitry include as part of monitoring circuitry 124, described above in relation to FIG. 1.

MCU 120 may perform a built-in test to detect invalid switch conditions of manual control panel 160. For example, if the manual control panel 160 provided an input signal 442 to open the outflow valve 150, but the actual manual control panel 160 mode switch was not set to manual and the manual signal 440 is not true, then MCU 120 may flag a fault for MMC unit 122 due to an invalid combination input of the input signals 442, 443, 444, and 440. In a similar manner, MCU 120 may perform other built-in tests to detect that the actual cabin pressure signal 430 is out of range, internal MMC unit 122 power supplies are not providing correct voltage, or motor 140 is not responding as commanded by MCU 120. In response to detecting that there is a fault in MMC unit 122, MCU 120 may be configured to set the fault signal 438 signal to true. When the MCU 120 sets the fault signal 438 to true, the shut off function 434 may disable continued operation of motor drive circuitry 432 from operating motor 140, ensuring that unsafe motor 140 operation does not occur.

MMC unit 122 also receives manual signal 440 from the manual control panel 160. If manual control panel 160 is not selected to manual mode, shut off function 434 is disabled preventing motor drive circuitry 432 from operating motor 140, unless altitude limit signal 402 is true. In this similar manner, shut off function 434 may arbitrate if MCU 120 may operate motor drive circuitry 432 and motor 140 for situations of faults (above), manual, or altitude limit control, or differential pressure limit control functionality (see below).

In the example of FIG. 4, pressure transducer 424 is a device with associated circuitry, which measures the pressure sense signal 126 (e.g., which may include both differential pressure data 201 and cabin pressure data 202 transmitted by DP sensor 226A and Pc sensor 226B, respectively) and converts it to a voltage (or other signal proportionally representative of cabin pressure 430 and/or differential pressure (not shown in FIG. 4)) for use by MCU 120 manual control logic 426, and also by the differential pressure limit logic 428. Pressure transducer 424 may further include any type of pressure sensor. Cabin pressure 430 is an example of Pc, described above in relation to FIGS. 1-3.

Manual control logic 426 may be configured to control outflow valve 150 based on commands received from control panel 360 as digits 442-444. For example, in response to a switch in control panel 360 being set to a slow descent rate position (e.g., the digits 100), manual control logic 426 may be configured to control the cabin altitude to descend the cabin altitude at the slow descent rate. In response to the switch being set to a fast descent rate position (e.g., the digits 011), manual control logic 426 may be configured to control the cabin altitude to descend the cabin altitude at the fast descent rate. In response to the switch being set to the slow climb rate position (e.g., the digits 101), manual control logic 426 may be configured to control the cabin altitude to climb the cabin altitude at a slow climb rate.

In response to the switch being set to the fast climb rate position (e.g., the digits 111), manual control logic 426 may be configured to control the cabin altitude to climb the cabin altitude at a fast climb rate. For the slow and fast descent positions, differential pressure limit logic 428 may be configured to maintain the differential pressure below a predetermined value that represents differential pressure limit 402. In response to the switch being set to the fast OFV close position (e.g., the digits 001), manual control logic 426 may be configured to control the OFV to move rapidly towards the closing direction. In response to the switch being set to the fast OFV open position (e.g., the digits 010), manual control logic 426 may be configured to control the OFV to move rapidly towards the opening direction until the cabin altitude reaches a limited value. Thus, digits 442-444 may encode a hold command, a rate of change command, or manual adjust command for outflow valve 150.

In operation, differential pressure limit logic 428 may be configured to utilize the cabin pressure and differential pressure signals (as discussed above in relation to FIGS. 1-4) from pressure transducer 424 to determine whether actual differential pressure (or cabin pressure) 430 is greater than the pre-programmed differential pressure limit threshold pressure (or less than the altitude limit threshold pressure), as discussed throughout. The differential pressure (and/or altitude) limit threshold pressure may be pre-programmed into MMC unit 122 by using analog circuitry, digital potentiometer, non-volatile memory, or another mechanism that stores the differential pressure (or altitude) limit threshold pressure. In response to determining that the actual differential pressure (or cabin pressure) 430 is greater than the differential pressure (and/or less than the cabin pressure for altitude limit) limit threshold pressure, differential pressure limit logic 428 may be configured to activate and set differential pressure limit 402 signal to true. In response to determining that differential pressure limit signal 402 is true, automatic control 112 may be configured to receive differential pressure limit signal 402 and identify the condition to the airplane for flight crew situational awareness. When differential pressure limit signal 402 is true, automatic control 112 motor control circuitry may be configured to disable and no longer operate motor 130.

When differential pressure limit signal 402 is true (e.g., when signals 204 and 206 are ANDed at gate 227), shut off function 434 may receive signal 402 and enable the motor 140 to be operated by the MCU 120 even though the manual signal 440 is not true. MMC unit 122 motor drive circuitry 432 can become enabled via motor 140 shut off function 434 when the signal 402 is true at shut off function 434. This allows MCU 120 to operate motor 140 to the open direction to increase the amount of fluid flow out of the cabin. MCU 120 may be configured to also utilize cabin pressure signal 430 from pressure sense 126 to compare against a known altitude limit threshold pressure. In response to determining that the cabin pressure signal 430 is less than the known altitude limit threshold pressure, MCU 120 may be configured to actively control motor 140 in the closed direction using the motor drive circuitry 432 which was enabled by the shut off function 434, when the differential pressure limit logic (for the altitude limit function) 428 sets the differential pressure limit signal (for altitude limit) 402 to true.

The circuitry of MMC unit 122 hosts pressure transducer 424 and performs differential pressure limit output 402 and differential pressure limit override logic 436 when the differential pressure exceeds a predetermined value. Thus, MMC unit 122 has its own power supply to support this function as described above in relation to FIG. 3.

In the event of a differential pressure limit event, MMC unit 122 provides a signal 402 to the automatic control unit 112, which may include an automatic motor control (AMC) unit. The differential pressure limit event signal 402 may disable the automatic motor control of motor 130. MMC unit 122 also drives the manual motor 140 open to limit further over-pressurization. The differential pressure limit opening speed may be "tuned" the to limit the initial overshoot to the differential pressure limit set-point and then "regulate" to that set-point.

MMC unit 122 may be configured to perform manual hold, manual slow climb, manual fast climb, manual slow descent, manual fast descent, manual OFV open, or manual OFV close or DUMP of OFV 150 if the flight deck mode switches in manual control panel 160 of user control panel 360 are set to MAN, and the selector switch of user control panel 360 is set to hold, slow climb, fast climb, slow descent, fast descent, OFV close or OFV open; or DUMP. During MAN-OFV open control or MAN-OFV close control, OFV 150 is opened or closed to a scheduled motor speed. The first few seconds of MAN-OFV open control or MAN-OFV close control may be a slow motor speed, then MCU 120 may be configured to command the remaining valve opening or closing at a higher motor speed. One reason for the slow-to-fast schedule is to limit the initial pressurization/depressurization rate prior to ultimately closing/opening the OFV.

If required, altitude limit can override the OFV open or slow climb or fast climb or DUMP function and limit the cockpit altitude. If the flight is above 15,000 feet, for example, after an initial overshoot the cockpit altitude may be limited to 15,000 feet, which is the US regulatory limit above which passengers require oxygen. In other examples, altitude limit override logic 436 can be utilized to allow the DUMP function to completely open the OFV, even when the aircraft is above the 15,000 feet altitude limit threshold.

Figure 5:
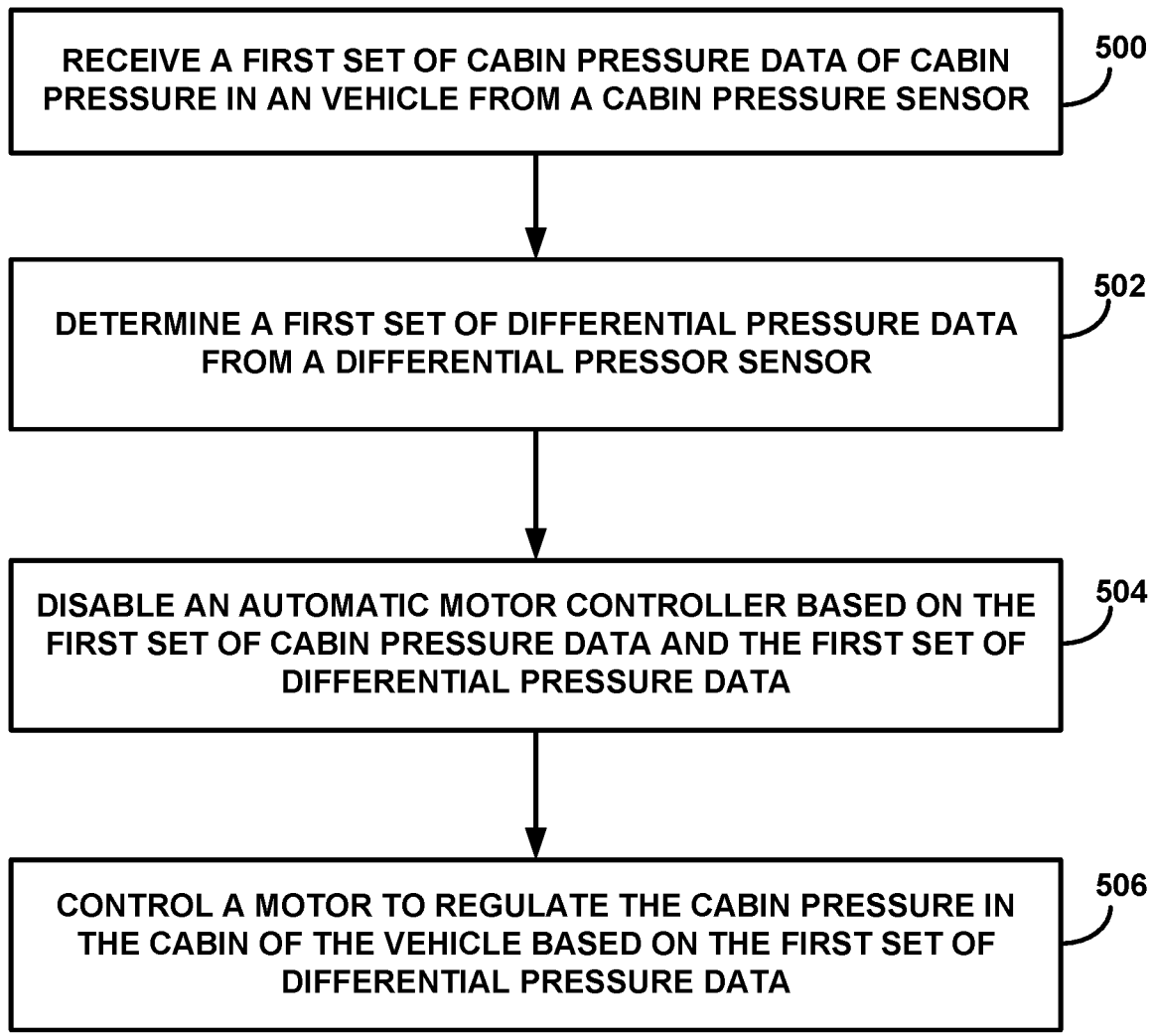
FIG. 5 is a flowchart illustrating an example operation of a manual control system overriding an automatic motor controller, according to one or more techniques of this disclosure.

FIG. 5 is a flowchart illustrating an example operation of a cabin pressure control system, according to one or more techniques of this disclosure. As discussed above in relation to FIGS. 1-3, the cabin pressure control system may be for a vehicle and comprise AMC 112 and MMC unit 122. MMC 112 may comprise a motor (e.g., one or motors 130, 140) configured to regulate a cabin pressure in a cabin of the vehicle. DP sensor 226A may be configured to determine a first set of differential pressure data and Pc sensor 226B may be configured to determine a first set of cabin pressure data. Processing circuitry (e.g., main MMC MCU 120) may be connectively coupled to DP sensor 226A and connectively coupled to Pc sensor 226B.

Processing circuitry (which may be main MMC MCU 120) receives a first set of cabin pressure data (e.g., cabin pressure data 202) defining cabin pressure of a vehicle cabin (e.g., an aircraft, shuttle, and so on) from Pc sensor 226B (500). In one example of block 500, the first set of cabin pressure data may be in the form of a digital signal or an analog signal. In one example of block 500, Pc sensor 226B is a device with associated circuitry, which measures cabin pressure within the vehicle and converts it to a voltage (or other signal proportionally representative of cabin pressure) for use by the processing circuitry.

Processing circuitry may further determine a first set of differential pressure data (e.g., differential pressure data 201) from DP sensor 226A (502). In some examples, the processing circuitry determining the first set of differential pressure data may include either receiving the first set of differential pressure data from DP sensor 226A sensor or calculating that first set of differential pressure data based on the second set of cabin pressure data and first set of ambient pressure data. In one example of block 502, the first set of cabin pressure data may be in the form of a digital signal or an analog signal. DP sensor 226A is a device with associated circuitry, and may independently sense the cabin-to-ambient differential pressure. For example, DP sensor 226A may include first and second ports, each configured to determine a pressure at a different location of the vehicle. For example, the first port may be configured to obtain a cabin pressure data and the second port may be configured to obtain ambient pressure data. DP sensor 226A may measure the pressure sense signal 126 within a first port of the cabin of a vehicle (e.g., an airplane, as so on) and at a second port at the vehicle to collect ambient pressure data, and convert it to a voltage (or other signal proportionally representative of cabin pressure) for use by the processing circuitry.

The processing circuitry may further disable an automatic motor controller (AMC) 212 based on the first set of cabin pressure data and the first set of differential pressure data (504). In one example of block 504, main MMC MCU 120 compares the first set of cabin pressure data and the first set of differential pressure data to one of a second set of cabin pressure data and a second set differential pressure data (e.g., differential pressure data 203) received from sensor MCU 225. The second set of cabin pressure data may also be transmitted along the same data path, from sensor MCU 225, to main MMC MCU 120, as differential pressure data 203. The comparison may be substantially similar to the comparison as described with respect to FIG. 2 between differential pressure data 201 and differential pressure data 203, but also including a comparison between cabin pressure data 202 and the second set of cabin pressure data. MMC unit 222 may be further configured to, responsive to the comparison not satisfying a threshold, determine one of the first set of differential pressure data is invalid.

In one example of block 504, as discussed with reference to FIG. 2, if the difference between differential pressure data 201 and differential pressure data 203 do not satisfy a threshold, main MMC MCU 220 compares differential pressure data 201 to a converted differential pressure data. The differential pressure data is converted using received first set of altitude data via A429 data bus from air data system and cabin pressure data 202 received from Pc sensor 226B. As discussed above in relation to FIG. 2, in one example of block 504, main MMC MCU 220 may convert altitude data, received via A429 data bus, to a second set of ambient pressure data. Main MMC MCU 220 may then compute a third set of differential pressure by subtracting the first set of cabin pressure, received from Pc sensor 226B, from the converted ambient pressure data. In one example of block 504, MMC unit 222 further comprises sensor MCU 225 connectively coupled to DP sensor 226A and connectively coupled to the Pc sensor 226B. In response to determining the comparison is not satisfied, MMC unit 222 may disable AMC 228.

In one example of block 504, the comparison may include comparing two of the first set of differential pressure data received directly from DP sensor 226A, the first set of differential pressure data received directly from sensor MCU 225, and the second set of differential pressure data. The comparison may further include, responsive to the comparison satisfying a threshold, determining one of the two compared differential pressure data is valid.

In one example of block 504, sensor MCU 225 determines a first differential pressure limit 204 based on the first set of cabin pressure data received from Pc sensor 226A and the first set of differential pressure data from DP sensor 226B, and transmits the first differential pressure limit 204 to an AND gate 227. Further, processing circuitry determines a second differential pressure limit 206 based on the received first set of cabin pressure data from Pc sensor 226A and receive the first set of differential pressure data from DP sensor 226A, and transmits the second differential pressure limit 206 to AND gate 227. AND gate 227 transmits a final altitude 207, based on the first differential pressure limit 204 and the second differential pressure limit 206, to cross channel signal 228 housed within AMC 212 thereby disabling 209 AMC 212 having control of motor 130 that is operating outflow valve 150.

Processing circuitry may further activate hardware enable circuit control 208 over motor 140 to regulate outflow valve 150 via valve gearbox 152 the cabin pressure in the cabin of the vehicle (506). Valve gearbox 152 may inform of positions and settings of outflow valve 150 to main MMC MCU 120 via data path 210. Processing circuitry may enable control of settings (e.g., open, close, and so on) of outflow valve 150 based on the first set of differential pressure data. In one example of block 506, main MMC MCU 120 controls differential pressure limit motor 140 to regulate differential pressure of the vehicle by adjusting outflow valve 150, via valve gearbox 152.

In addition to the example blocks discussed above, processing circuitry may be further configured to compute one of a cabin altitude, cabin altitude rate-of-change, and cabin-to-ambient differential pressure using the one of the first set of differential pressure data (differential pressure data 201) received directly from DP sensor 226B, the first set of differential pressure data (differential pressure data 203) received directly from sensor MCU 225, and the second set of differential pressure data (e.g., the converted differential pressure data using A429 altitude data 205). Further, processing circuitry can transmit one of the computed cabin altitude, cabin altitude rate of change, and cabin-to-ambient differential pressure to ACPC 312 and avionics via A429 data bus.

Figure 6:
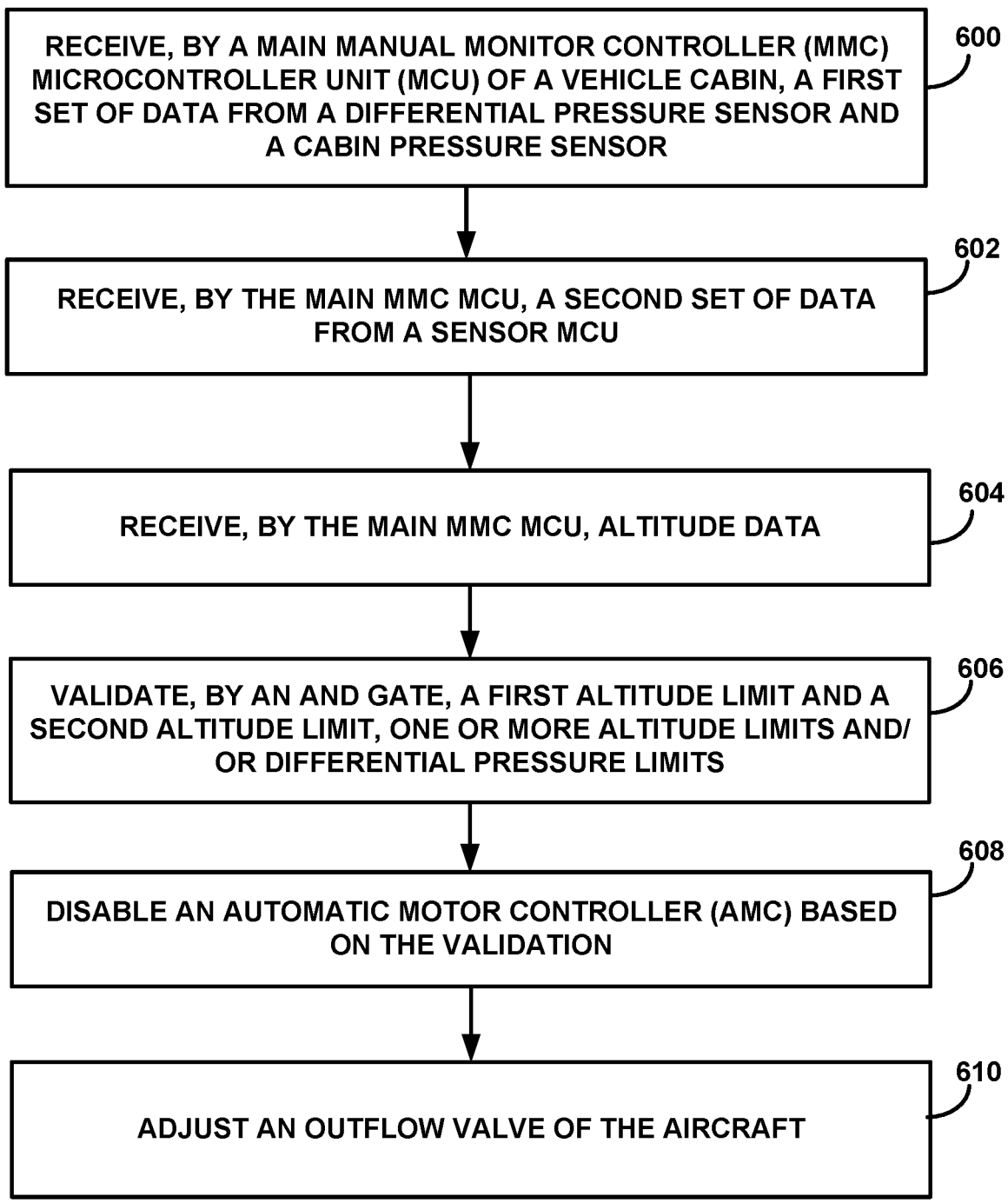
FIG. 6 is a flowchart illustrating an example operation of a manual control system overriding an automatic motor controller, according to one or more techniques of this disclosure.

FIG. 6 is a flowchart illustrating an example operation of a cabin pressure control system, according to one or more techniques of this disclosure. Processing circuitry (e.g., main MMC MCU 122, with reference to FIGS. 1, 2, and 4) may receive a first set of data (which may include cabin pressure data 202 and differential pressure data 201) from DP sensor 226A and Pc sensor 226B (500). In one example of block 600, the processing circuitry may be connectively coupled to each of DP sensor 226A and Pc sensor 226B.

Processing circuitry may receive a second set of data (e.g., which may include differential pressure data 203) from sensor MCU 225 (602). In one example of block 602, sensor MCU 225 is connectively coupled to each of DP sensor 226A and Pc sensor 226B. Processing circuitry may further receive altitude data 205 (604). In one example of block 604, processing circuitry may receive altitude data via A429 data bus. Processing circuitry may further validate, at AND gate 227, one or more altitude limits and/or differential pressure limits (606) based on a comparison (as discussed above) between the received data 201, 202, 203, and altitude data 205. In one example of block 606, the one or more altitude limits and/or differential pressure limits are derived from at least one of the first set of data, the second set of data, and the altitude data. Processing circuitry may further disable AMC 212 having control of outflow valve 150 based on the validation (608). In one example of block 608, AND gate 227 outputs cross channel signal 207 to disable logic circuit 228, to disable circuit 209, thereby disabling AMC 112 control over outflow valve 150 via motor 130.

Processing circuitry may further enable manual control of outflow valve 150 of the vehicle (610). In one example of block 610, processing circuitry adjusts outflow valve 150 via valve gearbox 152. In one example of block 610, processing circuitry adjusts outflow valve 150 to a setting that safely regulates cabin pressure to a safe differential pressure for the fuselage, the setting being based on feedback of outflow valve 150 settings via data path 210 and at least one of differential pressure data 201, 203, cabin pressure data 202, and altitude data 205.

The following numbered aspects demonstrate one or more aspects of the disclosure.

Aspect 1: a cabin pressure control system for a vehicle, the system comprising: an automatic motor controller system; and a manual motor controller (MMC) system, the MMC system comprising: a motor configured to regulate a cabin pressure in a cabin of the vehicle; a cabin pressure sensor configured to determine a first set of cabin pressure data; a differential cabin pressure sensor comprising a first port and a second port, each of the first and second ports configured to determine a pressure at a different location of the vehicle, the first port configured to obtain a second set of cabin pressure data and the second port configured to obtain a first set of ambient pressure data; processing circuitry connectively coupled to the cabin pressure sensor and connectively coupled to the differential cabin pressure sensor, the processing circuitry configured to: receive the first set of cabin pressure data from the cabin pressure sensor; determine a first set of differential pressure data from the differential pressure sensor, the first set of differential pressure data being a relation between the second set of cabin pressure data and the first set of ambient pressure data; disable the automatic motor controller based on the first set of differential pressure data; and control the motor to regulate the cabin pressure in the cabin of the aircraft based on the first set of differential pressure data.

Aspect 2: The cabin pressure control system of aspect 1, wherein the MMC system further comprises: a sensor MCU connectively coupled to the differential cabin pressure sensor and connectively coupled to the cabin pressure sensor, the sensor MCU configured to: receive the first set of cabin pressure data from the cabin pressure sensor; receive the first set of differential pressure data from the differential pressure sensor; transmit both the first set of cabin pressure data and the first set of differential pressure data to the processing circuitry.

Aspect 3: The cabin pressure control system of either aspects 1 or 2, wherein the MMC system is further configured to: compare the first set of differential pressure data received directly from the differential pressure sensor to the first set of differential pressure data received directly from the sensor MCU; and responsive to the comparison not satisfying a threshold, determine one of the first set of differential pressure data is invalid.

Aspect 4: The cabin pressure control system of any of aspects 1-3, wherein the MMC system is further configured to: receive a first set of altitude data from the air data system; convert the first set of altitude data to a second set of ambient pressure data; and calculate a second set of differential pressure data by subtracting the first set of cabin data from the second set of ambient pressure data.

Aspect 5: The cabin pressure control system of any of aspects 1-4, wherein the MMC system is further configured to: compare two of the first set of differential pressure data received directly from the differential pressure data, the first set of differential pressure data received directly from the sensor MCU, and the second set of differential pressure data; and responsive to the comparison satisfying a threshold, determine one of the two compared differential pressure data is valid.

Aspect 6: The cabin pressure control system of any of aspects 1-4, wherein the processing circuitry is further configured to: compute one of a cabin altitude, cabin altitude rate of change, and cabin-to-ambient differential pressure using the one of the first set of differential pressure data received directly from the differential pressure sensor, the first set of differential pressure data received directly from the sensor MCU, and the second set of differential pressure data.

Aspect 7: The cabin pressure control system of any of aspects 1-4, wherein the processing circuitry is further configured to: transmit one of the computed cabin altitude, cabin altitude rate of change, and cabin-to-ambient differential pressure to avionics via a data bus.

Aspect 8: The cabin pressure control system of any of aspects 1-7, the system further comprising: an automatic motor controller (AMC); wherein the sensor MCU determines a first differential pressure limit based on the first set of cabin pressure data from the cabin pressure sensor and the first set of differential pressure data from the differential pressure sensor, and transmits the first differential pressure limit to an AND gate, wherein the processing circuitry determines a second differential pressure limit based on the received first set of cabin pressure data from the cabin pressure sensor and receive the first set of differential pressure data from the differential pressure sensor, and transmits the second differential pressure limit to the AND gate, wherein the AND gate transmits a final differential pressure limit, based on the first differential pressure limit and the second differential pressure limit, to the AMC.

Aspect 9: The cabin pressure control system of any of aspects 1-8, the AMC is configured to adjust functionality of the aircraft upon the AND gate transmitting the final differential pressure limit.

Aspect 10: The cabin pressure control system of aspect 9, wherein adjusting functionality comprises adjusting an outflow valve of the aircraft.

Aspect 11: The cabin pressure control system of nay of aspects 1-10, wherein the processing circuitry is an MMC microcontroller unit (MCU).

Aspect 12: The cabin pressure control system of any of aspects 1-11, wherein the vehicle is an aircraft.

Aspect 13: The cabin pressure control system of any of aspects 1-12, wherein the first set of altitude data from the air data system is altitude data received via an A429 data bus.

Aspect 14. A method comprising: receiving, by processing circuitry connectively coupled to a cabin pressure sensor and connectively coupled to a differential cabin pressure sensor, a first set of cabin pressure data from a cabin pressure sensor located within a cabin of an vehicle; receiving, by the processing circuitry, a first set of differential pressure data from a differential pressure sensor, the differential pressure sensor comprising a first port and a second port, each of the first and second ports configured to: determine a pressure at a different location of the vehicle, the first port configured to obtain a second set of cabin pressure data and the second port configured to obtain a first set of ambient pressure data, the first set of differential pressure data being a relation between the second set of cabin pressure data and the first set of ambient pressure data; disabling an automatic motor controller based on the first set of cabin pressure data; and controlling a motor in a cabin of the vehicle to regulate the cabin pressure in the cabin of the vehicle based on the first set of differential pressure data.

Aspect 15. The method of aspect 14, further comprising: receiving a second set of cabin pressure data from a microcontroller unit (MCU) sensor; comparing the first set of differential pressure data to the second set of differential pressure data; and responsive to the comparison not satisfying a threshold, determining either the first set or second set of differential pressure data is invalid.

Aspect 16. The method of either aspects 14 or 15, further comprising: receiving a first set of altitude data from an air data system; converting the first set of altitude data to a second set of ambient pressure data; and calculating a third set of differential pressure data by subtracting the first set of cabin data from the second set of ambient pressure data.

Aspect 17: The method of any of aspects 14-16, further comprising: computing one of a cabin altitude, cabin altitude rate of change, and cabin-to-ambient differential pressure using the one of the first set of differential pressure data, the second set of differential pressure data, and the third set of differential pressure data.

Aspect 18: The method of any of aspects 14-17, further comprising transmitting one of the computed cabin altitude, cabin altitude rate of change, and cabin-to-ambient differential pressure to a control panel via a data bus.

Aspect 19: The method of any of aspects 14-18, wherein the processing circuitry is an MMC microcontroller unit.

Aspect 20: The method of any of aspects 14-19, wherein the vehicle is an aircraft.

Various examples of the disclosure have been described. These and other examples are within the scope of the following claims.

In one or more examples, the functions described above may be implemented in hardware, software, firmware, or any combination thereof. For example, MMC unit 122, MMC unit 320, AMC 112, microcontroller 110, auto motor controller 331, manual motor controller 320, and other components that include processing circuitry may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more digital signal processors, general purpose microprocessors, application-specific integrated circuits, field-programmable gate arrays, or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described.

What is claimed is:

1. A cabin pressure control system for a vehicle, the cabin pressure control system comprising:
    an automatic motor controller system; and
    a manual motor controller (MMC) system, the MMC system comprising:
        a motor configured to regulate a cabin pressure in a cabin of the vehicle;
        a cabin pressure sensor configured to determine a first set of cabin pressure data;
        a differential pressure sensor comprising a first port and a second port, each of the first and second ports configured to determine a pressure at a different location of the vehicle, the first port configured to obtain a second set of cabin pressure data and the second port configured to obtain a first set of ambient pressure data;
        processing circuitry connectively coupled to the cabin pressure sensor and connectively coupled to the differential pressure sensor, the processing circuitry configured to:
            receive the first set of cabin pressure data from the cabin pressure sensor;
            determine a first set of differential pressure data directly from the differential pressure sensor, the first set of differential pressure data being a relation between the second set of cabin pressure data and the first set of ambient pressure data;
            receive the first set of differential pressure data from a sensor microcontroller unit (MCU) connectively coupled to the differential pressure sensor, wherein the sensor MCU is separate from the processing circuitry;
            compare the first set of differential pressure data determined directly from the differential pressure sensor to the first set of differential pressure data received from the sensor MCU;
            responsive to a comparison of the first set of differential pressure data determined directly from the differential pressure sensor to the first set of differential pressure data received from the sensor MCU not satisfying a threshold, determine one of the first set of differential pressure data is invalid;
            disable the automatic motor controller based on the first set of differential pressure data that is not determined to be invalid; and
            control the motor to regulate the cabin pressure in the cabin of the vehicle based on the first set of differential pressure data that is not determined to be invalid.

2. The cabin pressure control system of claim 1, wherein the sensor MCU is configured to:
    receive the first set of cabin pressure data from the cabin pressure sensor;
    receive the first set of differential pressure data from the differential pressure sensor;
    transmit both the first set of cabin pressure data and the first set of differential pressure data to the processing circuitry.

3. The cabin pressure control system of claim 2, wherein the MMC system is further configured to:
    receive a first set of altitude data from an air data system;
    convert the first set of altitude data to a second set of ambient pressure data; and
    calculate a second set of differential pressure data by subtracting the first set of cabin data from the second set of ambient pressure data.

4. The cabin pressure control system of claim 3, wherein the MMC system is further configured to:
    compare two of the first set of differential pressure data determined directly from the differential pressure sensor, the first set of differential pressure data received from the sensor MCU, and the second set of differential pressure data; and
    responsive to a comparison of the two of the first set of differential pressure data determined directly from the differential pressure sensor, the first set of differential pressure data received from the sensor MCU, and the second set of differential pressure data satisfying a threshold, determine that one of the two compared differential pressure data is valid.

5. The cabin pressure control system of claim 4, wherein the processing circuitry is further configured to:
    compute one of a cabin altitude, cabin altitude rate of change, and cabin-to-ambient differential pressure using the one of the two compared differential pressure data that is determined to be valid.

6. The cabin pressure control system of claim 5, wherein the processing circuitry is further configured to:
    transmit one of the computed cabin altitude, cabin altitude rate of change, and cabin-to-ambient differential pressure to avionics via a data bus.

7. The cabin pressure control system of claim 2, the system further comprising:
    an automatic motor controller (AMC);
    wherein the sensor MCU determines a first differential pressure limit based on the first set of cabin pressure data from the cabin pressure sensor and the first set of differential pressure data from the differential pressure sensor, and transmits the first differential pressure limit to an AND gate,
    wherein the processing circuitry determines a second differential pressure limit based on the received first set of cabin pressure data from the cabin pressure sensor and receive the first set of differential pressure data from the differential pressure sensor, and transmits the second differential pressure limit to the AND gate,
    wherein the AND gate transmits a final differential pressure limit, based on the first differential pressure limit and the second differential pressure limit, to the AMC.

8. The cabin pressure control system of claim 7, the AMC is configured to adjust functionality of the vehicle upon the AND gate transmitting the final differential pressure limit.

9. The cabin pressure control system of claim 8, wherein adjusting functionality comprises adjusting an outflow valve of the vehicle.

10. The cabin pressure control system of claim 1, wherein the processing circuitry is an MMC microcontroller unit (MCU).

11. The cabin pressure control system of claim 1, wherein the vehicle is an aircraft.

12. The cabin pressure control system of claim 3, wherein the first set of altitude data from the air data system is received via an A429 data bus.

13. A method comprising:
receiving, by processing circuitry connectively coupled to a cabin pressure sensor and connectively coupled to a differential pressure sensor, a first set of cabin pressure data from a cabin pressure sensor located within a cabin of a vehicle;
determining, by the processing circuitry, a first set of differential pressure data directly from the differential pressure sensor, the differential pressure sensor comprising a first port and a second port, each of the first and second ports configured to:
determine a pressure at a different location of the vehicle, the first port configured to obtain a second set of cabin pressure data and the second port configured to obtain a first set of ambient pressure data, the first set of differential pressure data being a relation between the second set of cabin pressure data and the first set of ambient pressure data;
receiving, by the processing circuitry, the first set of differential pressure data from a sensor microcontroller unit (MCU) connectively coupled to the differential pressure sensor, wherein the sensor MCU is separate from the processing circuitry;
comparing, by the processing circuitry, the first set of differential pressure data determined directly from the differential pressure sensor to the first set of differential pressure data received from the sensor MCU;
responsive to a comparison of the first set of differential pressure data determined directly from the differential pressure sensor to the first set of differential pressure data received from the sensor MCU not satisfying a threshold, determining, by the processing circuitry, one of the first set of differential pressure data is invalid;
disabling, by the processing circuitry, an automatic motor controller based on the first set of cabin pressure data that is not determined to be invalid; and
controlling, by the processing circuitry, a motor in a cabin of the vehicle to regulate the cabin pressure in the cabin of the vehicle based on the first set of differential pressure data that is not determined to be invalid.

14. The method of claim 13, further comprising
receiving, by the processing circuitry, a first set of altitude data from an air data system;
converting, by the processing circuitry, the first set of altitude data to a second set of ambient pressure data; and
calculating, by the processing circuitry, a second set of differential pressure data by subtracting the first set of cabin data from the second set of ambient pressure data.

15. The method of claim 14, further comprising:
computing, by the processing circuitry, one of a cabin altitude, cabin altitude rate of change, and cabin-to-ambient differential pressure using one of the first set of differential pressure data determined directly from the differential pressure sensor, the first set of differential pressure data received from the sensor MCU, and the second set of differential pressure data.

16. The method of claim 15, further comprising:
transmitting one of the computed cabin altitude, cabin altitude rate of change, and cabin-to-ambient differential pressure to avionics via a data bus.

17. The method of claim 13, wherein the processing circuitry is an MMC microcontroller unit.

18. The method of claim 13, wherein the vehicle is an aircraft.

* * * * *